United States Patent
Mori (10) Patent No.: US 10,533,625 B2
(45) Date of Patent: Jan. 14, 2020

(54) DAMPING FORCE ADJUSTABLE SHOCK ABSORBER

(71) Applicant: HITACHI AUTOMOTIVE SYSTEMS, LTD., Ibaraki (JP)

(72) Inventor: Shunsuke Mori, Yokohama (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/762,326

(22) PCT Filed: Sep. 27, 2016

(86) PCT No.: PCT/JP2016/078362
§ 371 (c)(1),
(2) Date: Mar. 22, 2018

(87) PCT Pub. No.: WO2017/073219
PCT Pub. Date: May 4, 2017

(65) Prior Publication Data
US 2018/0266514 A1    Sep. 20, 2018

(30) Foreign Application Priority Data
Oct. 27, 2015 (JP) .................................. 2015-210864

(51) Int. Cl.
*F16F 9/32* (2006.01)
*F16F 15/03* (2006.01)
(Continued)

(52) U.S. Cl.
CPC ................ *F16F 15/03* (2013.01); *F16F 9/34* (2013.01); *F16F 15/022* (2013.01); *F16F 15/027* (2013.01)

(58) Field of Classification Search
CPC ...... F16F 9/324; F16F 9/34; F16F 9/46; F16F 15/03; F16F 15/022; F16F 15/027; F16K 31/06; H01F 7/1607
(Continued)

(56) References Cited

U.S. PATENT DOCUMENTS 5,683,151 A    11/1997  Friedow et al.
9,046,145 B2 *  6/2015  Murakami ............... F16F 9/325
(Continued)

FOREIGN PATENT DOCUMENTS

JP    9-506309      6/1997
JP    2007-120713   5/2007
(Continued)

OTHER PUBLICATIONS

International Search Report dated Nov. 1, 2016 in International (PCT) Application No. PCT/JP2016/078362.

*Primary Examiner* — Thomas W Irvin
(74) *Attorney, Agent, or Firm* — Wenderoth, Lind & Ponack, L.L.P.

(57) ABSTRACT

A damping force adjustable shock absorber that smoothly transfers a magnetic flux while a solenoid is downsized. An electromagnetic damping force adjustment device of the damping force adjustable shock absorber includes a damping force adjustment valve for generating a damping force, and a solenoid for variably adjusting the generated damping force. The solenoid includes a coil configured to generate a magnetic force through supply of current, a cap member having a bottomed tubular shape disposed on an inner peripheral side of the coil, a movable iron core disposed on an inner peripheral side of the cap member, an anchor member configured to attract the movable iron core, a shaft part provided on an inner peripheral side of the movable iron core, and a back-pressure-chamber formation member having a bottomed tubular shape, which is positioned on another
(Continued)

end side of the shaft part, and configured to form a back pressure chamber.

4 Claims, 3 Drawing Sheets

(51) Int. Cl.
  *F16F 9/34* (2006.01)
  *F16F 15/02* (2006.01)
  *F16F 15/027* (2006.01)
(58) Field of Classification Search
  USPC .................................................... 188/266.6
  See application file for complete search history.

(56) References Cited

U.S. PATENT DOCUMENTS

| | | | |
|---|---|---|---|
| 9,285,006 B2* | 3/2016 | Katayama | F16F 9/325 |
| 2009/0189104 A1 | 7/2009 | Bamber | |
| 2011/0073424 A1* | 3/2011 | Murakami | F16F 9/465 |
| | | | 188/322.13 |
| 2015/0041265 A1* | 2/2015 | Yamashita | F16F 9/18 |
| | | | 188/315 |
| 2018/0094692 A1* | 4/2018 | Hase | F16F 9/464 |
| 2018/0245660 A1* | 8/2018 | Yamashita | F16F 9/34 |

FOREIGN PATENT DOCUMENTS

| | | |
|---|---|---|
| JP | 2011-511216 | 4/2011 |
| JP | 2014-11352 | 1/2014 |

* cited by examiner

DAMPING FORCE ADJUSTABLE SHOCK ABSORBER

TECHNICAL FIELD

The present invention relates to a damping force adjustable shock absorber, which is to be installed in a vehicle, for example, a four-wheeled motor vehicle, and is preferably used to absorb vibration of the vehicle.

BACKGROUND ART

A damping force adjustable shock absorber is provided between a wheel side and a vehicle body side, which move relatively to each other, of a vehicle, for example, a four-wheeled motor vehicle. The damping force adjustable shock absorber is configured to absorb, for example, vibration in an up-and-down direction generated during a travel. As the damping force adjustable shock absorber, there has been known a damping force adjustable shock absorber including an electromagnetic damping force adjustment device configured to variably adjust the damping force in accordance with, for example, travel conditions and behaviors of a vehicle (for example, see Patent Literatures 1 and 2).

CITATION LIST

Patent Literature

PTL 1: JP Hei 9-506309 A
PTL 2: JP 2014-11352 A

SUMMARY OF INVENTION

Technical Problem

Incidentally, the electromagnetic damping force adjustment device described in Patent Literature 1 includes a cap member provided on an inner peripheral side of a coil configured to generate a magnetic force and a movable iron core directly provided in the cap member, to thereby achieve a small-size and low-cost configuration. However, when a configuration of forming a back pressure chamber on a rear surface of a shaft part configured to move a valve body is directly applied as described in Patent Literature 2, there arise problems in terms of transfer of a magnetic flux, a size, and a magnetic resistance.

The present invention has an object to provide a damping force adjustable shock absorber, which includes a back-pressure-chamber formation member formed of a non-magnetic substance to thereby achieve downsizing of a solenoid and smooth transfer of the magnetic flux.

Solution to Problem

In order to solve the above-mentioned problems, according to one embodiment of the present invention, there is provided a damping force adjustable shock absorber including: a coil, which is configured to generate a magnetic force through supply of current; a cap member, which has a bottomed tubular shape, and is disposed on an inner peripheral side of the coil; an iron core, which is disposed on an inner peripheral side of the cap member, and is provided so as to be movable in an axial direction of the damping force adjustable shock absorber; a fixed iron core, which is configured to attract the iron core; an overmold, which has a bottomed tubular shape, and is configured to cover an outer periphery of the coil; a shaft part, which is provided on an inner peripheral side of the iron core, and has a communication passage is formed on an inner peripheral side thereof; a valve body, which is provided in the shaft part; a bush, which is configured to support the shaft part; and a back-pressure-chamber formation member, which has a bottomed tubular shape, has an inner peripheral side fitted to the bush, and forms a back pressure chamber between an end portion of the shaft part on a side opposite to the fixed iron core and the bush, wherein the back-pressure-chamber formation member is formed of a non-magnetic substance.

According to the damping force adjustable shock absorber of the one embodiment of the present invention, the solenoid can be decreased in size and weight.

DESCRIPTION OF EMBODIMENTS

Figure 1:
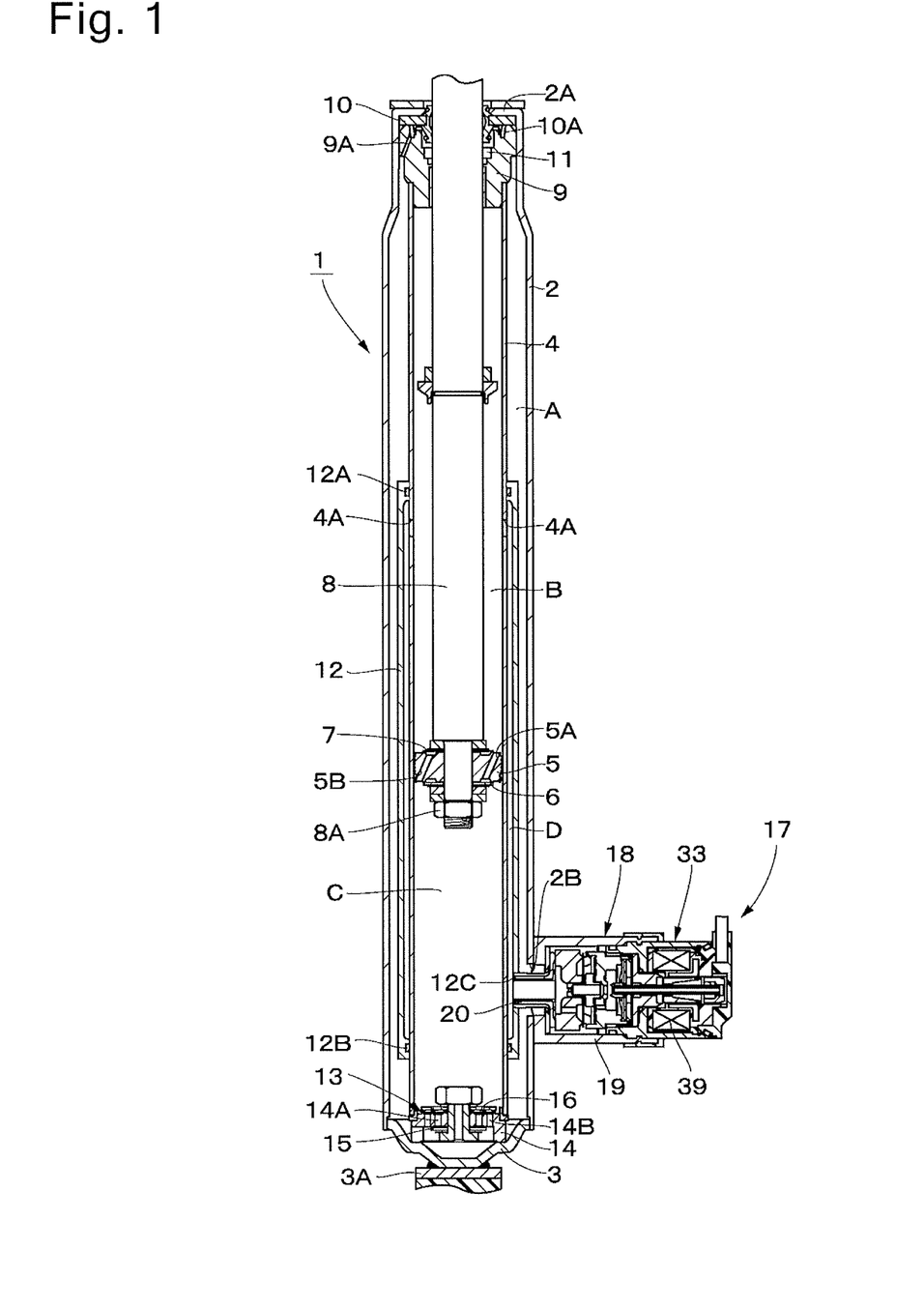
FIG. 1 is a vertical sectional view for illustrating a damping force adjustable shock absorber according to an embodiment of the present invention.
Figure 2:
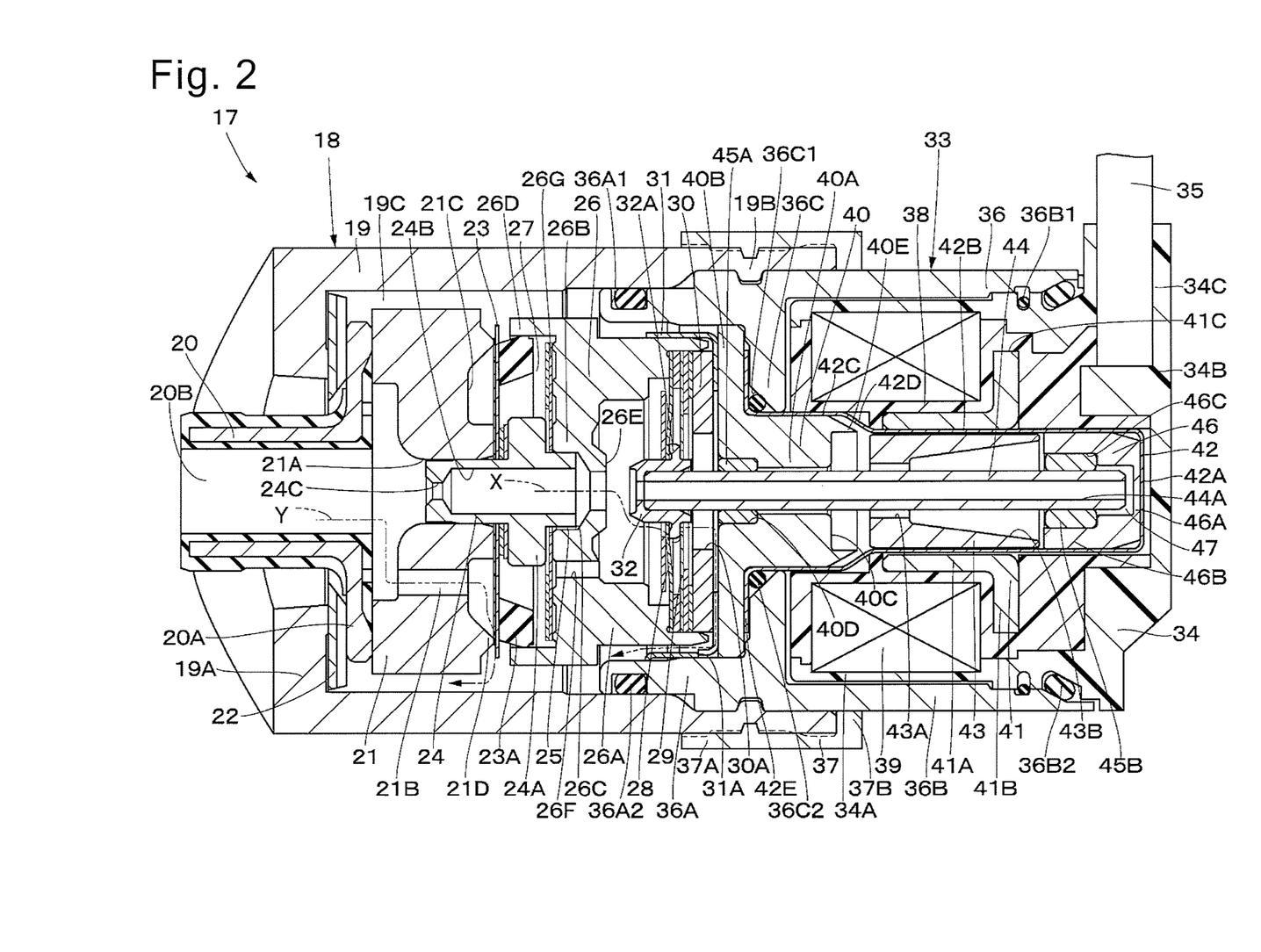
FIG. 2 is an enlarged sectional view for illustrating an electromagnetic damping force adjustment device of FIG. 1 in an enlarged manner.
Figure 3:
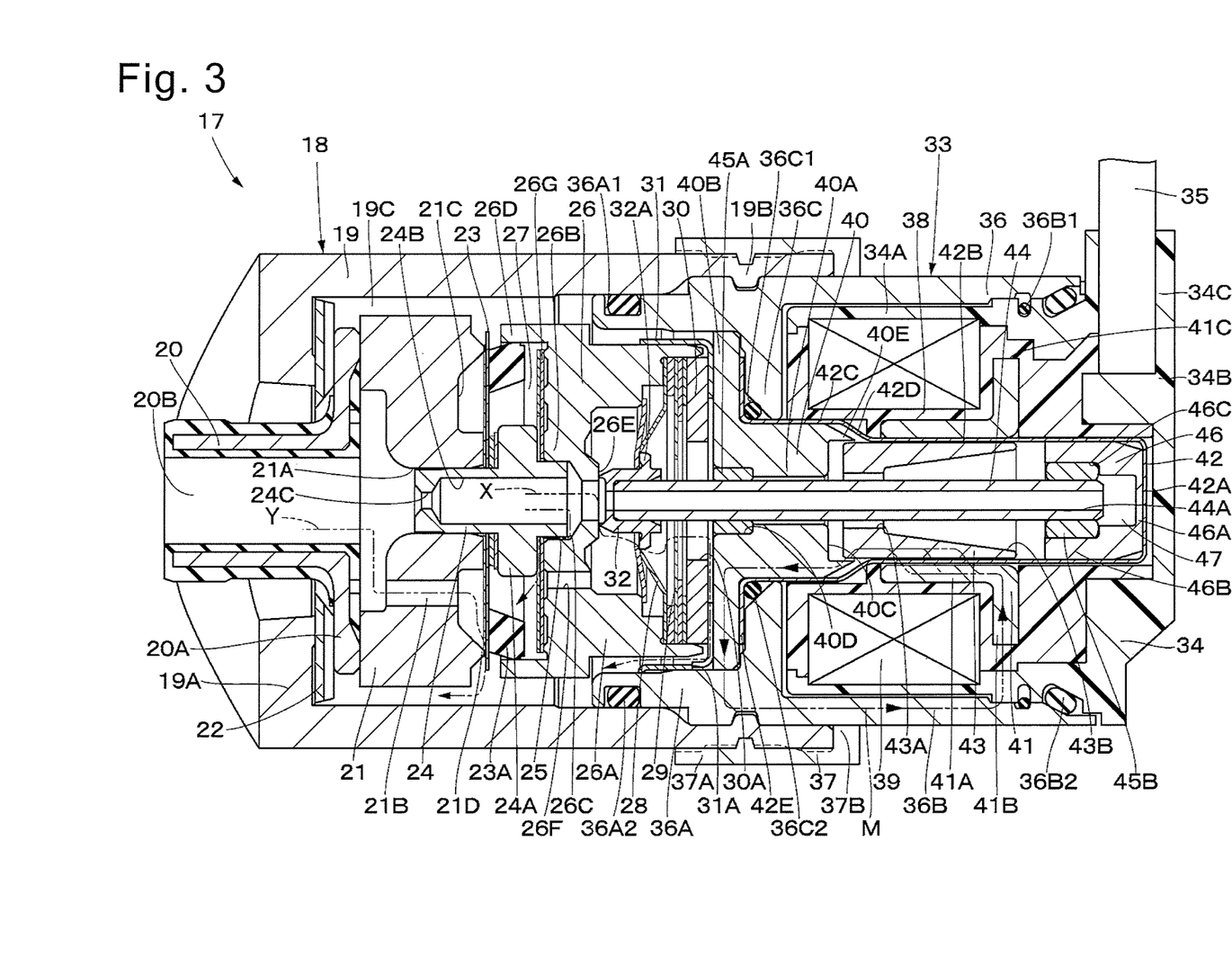
FIG. 3 is an enlarged sectional view for illustrating the electromagnetic damping force adjustment device when current is supplied to a coil.

Now, with reference to FIG. 1 to FIG. 3, detailed description is given of an example in which a damping force adjustable shock absorber according to an embodiment of the present invention is applied to a damping force adjustable hydraulic shock absorber for a vehicle.

An outer tube 2 having a bottomed tubular shape, which forms an outer shell of a damping force adjustable hydraulic shock absorber 1 (hereinafter referred to as shock absorber 1), is closed by a bottom cap 3 on a bottom end side through welding means or the like, and is formed into a caulking portion 2A bent radially inward on a top end side. A rod guide 9 and a seal member 10 are provided between the caulking portion 2A and an inner tube 4. Meanwhile, an opening 2B is formed on a lower side of the outer tube 2 so as to be concentric with a connection port 12C of an intermediate tube 12 described later, and an electrognetic damping force adjustment device 17 described later is mounted so as to be opposed to the opening 2B. A mounting eye 3A, which is to be mounted to, for example, a wheel side of the vehicle, is provided in the bottom cap 3.

The inner tube 4 is provided in the outer tube 2 so as to be coaxial with the outer tube 2. A bottom end side of the inner tube 4 is fitted to be mounted to a bottom valve 13. A top end side is fitted to be mounted to the rod guide 9. Oil liquid serving as hydraulic fluid is enclosed in the inner tube 4. The hydraulic fluid is not limited to the oil liquid and oil, and may be, for example, water including an additive mixed therein.

An annular reservoir chamber A is formed between the inner tube 4 and the outer tube 2. Gas is enclosed together with the oil liquid in the reservoir chamber A. This gas may be the air in an atmospheric-pressure state, or gas, for example, compressed nitrogen gas may be used. Moreover, oil holes 4A for causing a rod-side oil chamber B to always communicate to an annular oil chamber D are radially bored at an intermediate position in a lengthwise direction (axial direction) of the inner tube 4.

The piston 5 is inserted and fitted to the inner tube 4 so as to be slidable. The piston 5 defines the rod-side oil chamber B and a bottom-side oil chamber C inside the inner tube 4. A plurality of oil passages 5A and a plurality of oil passages 5B for enabling communication between the rod-side oil chamber B and the bottom-side oil chamber C are respectively formed in the piston 5 so as to be separated from one another in a circumferential direction.

On this occasion, a disc valve 6 on an extension side is provided on a bottom end surface of the piston 5. When the piston 5 displaces upward through sliding in an extension stroke of the piston rod 8, and a pressure in the rod-side oil chamber B exceeds a relief set pressure, the disc valve 6 on the extension side is opened, and a pressure on this occasion is relieved to a bottom-side oil chamber C side via the respective oil passages 5A. This relief set pressure is set to a pressure higher than a valve opening pressure that is given when the electromagnetic damping force adjustment device 17 described later is set to hard.

A compression-side check valve 7 is provided on a top end surface of the piston 5. When the piston 5 displaces downward through sliding in a compression stroke of the piston rod 8, the compression-side check valve 7 is opened, and is closed otherwise. This check valve 7 is configured to allow the oil liquid in the bottom-side oil chamber C to flow through each of the oil passages 5B toward the rod-side oil chamber B, and block a flow of the oil liquid in an opposite direction. A valve opening pressure of the check valve 7 is set to a pressure lower than a valve opening pressure that is given when the electromagnetic damping force adjustment device 17 described later is set to soft, and a damping force is not substantially generated. A force that is given when the damping force is not substantially generated is equal to or less than frictions of the piston 5 and the seal member 10, and does not affect a motion of the vehicle.

A bottom end side of the piston rod 8 extending in the axial direction in the inner tube 4 is inserted to the inner tube 4, and is fixedly mounted to the piston 5 with a nut 8A or the like. Moreover, a top end side of the piston rod 8 protrudes to the outside of the outer tube 2 and the inner tube 4 via the rod guide 9. A bottom end of the piston rod 8 may be further extended to protrude outward from a bottom portion (for example, the bottom cap 3) side, thereby serving as a so-called double-rod.

The rod guide 9 having a stepped cylindrical shape is provided on a top end side of the inner tube 4. The rod guide 9 is configured to position a top side portion of the inner tube 4 at a center of the outer tube 2, and guide the piston rod 8 so that the piston rod is slidable in the axial direction on an inner peripheral side of the rod guide 9. Moreover, an annular seal member 10 is provided between the rod guide 9 and the caulking portion 2A of the outer tube 2. The seal member 10 is formed through vulcanization bonding of an elastic material, for example, rubber, on a metal ring plate having a hole at a center for receiving the piston rod 8 inserted thereto, and an inner periphery is held in slide contact with an outer peripheral side of the piston rod 8, thereby sealing a gap to the piston rod 8.

Moreover, a lip seal 10A serving as a check valve extending so as to be brought into contact with the rod guide 9 is formed on a bottom surface side of the seal member 10. The lip seal 10A is disposed between an oil reservoir chamber 11 and the reservoir chamber A, and is configured to allow a flow of the oil liquid and the like in the oil reservoir chamber 11 toward the reservoir chamber A side via a return passage 9A of the rod guide 9, and block a flow in an opposite direction.

The intermediate tube 12 is positioned and disposed between the outer tube 2 and the inner tube 4. The intermediate tube 12 is mounted on, for example, an outer peripheral side of the inner tube 4 through interposition of top and bottom tubular seals 12A and 12B. The intermediate tube 12 has the annular oil chamber D inside thereof, which extends so as to surround the outer peripheral side of the inner tube 4 over the entire periphery. The annular oil chamber D is an oil chamber independent of the reservoir chamber A. The annular oil chamber D always communicates to the rod-side oil chamber B via the radial oil holes 4A formed in the inner tube 4. Moreover, a connection port 12C, to which a tubular holder 20 of the damping force adjustment valve 18 described later is mounted, is provided on a bottom end side of the intermediate tube 12.

The bottom valve 13 is positioned on a bottom end side of the inner tube 4, and is provided between the bottom cap 3 and the inner tube 4. The bottom valve 13 includes a valve body 14, a compression-side disc valve 15, and an extension-side check valve 16. The valve body 14 defines the reservoir chamber A and the bottom-side oil chamber C between the bottom cap 3 and the inner tube 4. The compression-side disc valve 15 is provided on a bottom surface side of the valve body 14. The extension-side check valve 16 is provided on a top surface side of the valve body 14. Oil passages 14A and 14B enabling the communication between the reservoir chamber A and the bottom-side oil chamber C are formed in the valve body 14 so as to be apart from each other in the circumferential direction.

When the piston 5 displaces downward through sliding in the compression stroke of the piston rod 8, and the pressure in the bottom-side oil chamber C exceeds a relief set pressure, the compression-side disc valve 15 is opened, and the pressure on this occasion is relieved to a reservoir chamber A side via the respective oil passages 14A. This relief set pressure is set to a pressure higher than a valve opening pressure that is given when the electromagnetic damping force adjustment device 17 described later is set to hard.

When the piston 5 displaces upward through sliding in the extension stroke of the piston rod 8, the extension-side check valve 16 is opened, and is closed otherwise. This check valve 16 is configured to allow the oil liquid in the reservoir chamber A to flow through each of the oil passages 14B toward the bottom-side oil chamber C, and block a flow of the oil liquid in an opposite direction. A valve opening pressure of the check valve 16 is set to a pressure lower than a valve opening pressure that is given when the electromagnetic damping force adjustment device 17 described later is set to soft, and a damping force is not substantially generated.

Next, with reference to FIG. 1 to FIG. 3, description is given of the electromagnetic damping force adjustment device 17 configured to variably adjust the generated damping force of the shock absorber 1. FIG. 2 is an illustration of the opened state in which the valve body 32 is moved (displaced) to a side on which the valve body 32 is separated from a valve seat part 26E of a pilot body 26 by a hydraulic pressure that is given when the current is not supplied to a coil 39 of a solenoid 33. Moreover, FIG. 3 is an illustration of the closed state in which the valve body 32 is moved to a side on which the valve body 32 seats on the valve seat part 26E of the pilot body 26 in accordance with the supply of current to the coil 39 of the solenoid 33.

As illustrated in FIG. 1, a base end side (one end side, a left end side in FIG. 1 to FIG. 3) of the electromagnetic damping force adjustment device 17 is disposed so as to interpose between the reservoir chamber A and the annular oil chamber D, and a distal end side (another end side, a right end side of FIG. 1 to FIG. 3) is provided so as to protrude radially outward from the lower portion of the outer tube 2. The electromagnetic damping force adjustment device 17 includes the damping force adjustment valve 18 configured to generate the damping force and the solenoid 33 configured to variably adjust the generated damping force. Specifically, the electromagnetic damping force adjustment device 17 is configured to control the flow of the oil liquid from the annular oil chamber D to the reservoir chamber A through the damping force adjustment valve 18, to thereby generate the damping force. Moreover, the electromagnetic damping force adjustment device 17 is configured to adjust a valve opening pressure of the damping force adjustment valve 18 (for example, a main disc valve 23) through the solenoid 33 used as a damping force variable actuator, to thereby variably adjust the generated damping force.

On this occasion, the damping force adjustment valve 18 includes, for example, a valve case 19, a tubular holder 20, a valve member 21, the main disc valve 23, and the valve body 32. The valve case 19 has an approximately cylindrical shape, and has a base end side fixedly mounted to a periphery of the opening 2B of the outer tube 2 and a distal end side protruding radially outward from the outer tube 2. The a tubular holder 20 has a base end side fixed to the connection port 12C of the intermediate tube 12 and a distal end side forming an annular flange part 20A, and is disposed on an inner side of the valve case 19 with a gap. The valve member 21 is held in contact with a flange part 20A of the tubular holder 20.

The bottom end side of the valve case 19 forms an inner flange part 19A protruding radially inward. The distal end side of the valve case 19 forms a caulking fixing part for engaging an inner-peripheral-side engagement part 19B of the valve case 19 with a tubular case 36 for fixing through caulking. An annular oil chamber 19C communicating to the reservoir chamber A is formed between an inner peripheral surface of the valve case 19 and outer peripheral surfaces of the valve member 21, the pilot body 26, and the like described later.

An inner side of the tubular holder 20 forms an oil passage 20B having one end side communicating to the annular oil chamber D and another end side extending to a position of the valve member 21. Moreover, an annular spacer 22 is sandwiched between the flange part 20A of the tubular holder 20 and the inner flange part 19A of the valve case 19. The spacer 22 causes the oil chamber 19C and the reservoir chamber A to communicate to each other via the oil passage 20B.

The valve member 21 has a center hole 21A. The center hole 21A is positioned at a radial center, and extends in the axial direction. Moreover, a plurality of oil passages 21B are provided so as to be separated from one another in a circumferential direction in a periphery of the center hole 21A in the valve member 21. One end side of each of the oil passages 21B always communicates to an oil passage 20B side of the tubular holder 20. Moreover, on an end surface on another end side of the valve member 21, there are provided an annular recessed part 21C and an annular valve seat 21D. The annular recessed part 21C is formed so as to surround openings on another side of the oil passages 21B. The annular valve seat 21D is positioned on a radially outer side of the annular recessed part 21C, and the main disc valve 23 described later seats on and separates from the annular valve seat 21D. On this occasion, the oil passages 21B of the valve member 21 cause the oil liquid to flow between the annular oil chamber D side (oil passage 20B side) and the reservoir chamber A side (oil chamber 19C side) via the main disc valve 23.

An inner peripheral side of the main disc valve 23 forming a main valve is sandwiched between the valve member 21 and a larger diameter part 24A of a pilot pin 24 described later, and an outer peripheral side thereof seats on the annular valve seat 21D of the valve member 21. An elastic seal member 23A is fixedly mounted to an outer peripheral portion on a rear surface side of the main disc valve 23. The main disc valve 23 is configured to receive a pressure on an oil passage 21B side (annular oil chamber D side) of the valve member 21 to separate from the annular valve seat 21D, to thereby open, and cause the oil passages 21B (annular oil chamber D side) of the valve member 21 to communicate to the oil chamber 19C (reservoir chamber A side). In this case, the valve opening pressure of the main disc valve 23 is variably controlled in accordance with a pressure in a pilot chamber 27 described later.

The pilot pin 24 is formed into a stepped cylindrical shape including the larger diameter part 24A at an axially intermediate portion, and a center hole 24B extending in the axial direction at a radially center portion. An orifice 24C is formed in a portion on the one end side of the center hole 24B. The one end side of the pilot pin 24 is press-fitted to the center hole 21A of the valve member 21. The main disc valve 23 is sandwiched between the larger diameter part 24A and the valve member 21. The another end side of the pilot pin 24 is fitted to a center hole 26C of the pilot body 26 described later. In this state, an oil passage 25 extending in the axial direction is formed between the center hole 26C of the pilot body 26 and the another end side of the pilot pin 24, and is connected to the pilot chamber 27 formed between the main disc valve 23 and the pilot body 26 via the oil passage 25.

The pilot body 26 is formed into an approximately bottomed tubular shape including a cylinder part 26A having a stepped hole on an inner side thereof, and a bottom part 26B closing the cylinder part 26A. The center hole 26C, to which another end side of the pilot pin 24 is fitted, is formed at a center portion of the bottom part 26B. A protruding tube part 26D, which is positioned on a radially outer side and protrudes toward a valve member 21 side over an entire periphery, is provided on one end side (left end side of FIG. 2) of the bottom part 26B of the pilot body 26. The elastic seal member 23A of the main disc valve 23 is fitted, in a liquid-tight manner, to an inner peripheral surface of the protruding tube part 26D, to thereby form the pilot chamber 27 between the main disc valve 23 and the pilot body 26. An inner pressure of the pilot chamber 27 acts on the main disc valve 23 in a closing direction, namely a direction of seating the main disc valve 23 on the annular valve seat 21D of the valve member 21.

The valve seat part 26E that the valve body 32 described later seats on and separates from is provided so as to surround the center hole 26C on the another end side (right end side of FIG. 2) of the bottom part 26B of the pilot body 26. An oil passage 26F passing through the bottom part 26B in the axial direction is formed on an outer peripheral side of the valve seat part 26E. The oil passage 26F releases the oil liquid to a valve body 32 side via a flexible disc 26G when the inner pressure of the pilot chamber 27 excessively increases through the opening operation of the main disc valve 23.

Moreover, a return spring 28 configured to urge the valve body 32 in a direction of separating from the valve seat part 26E of the pilot body 26, a disc valve 29 forming a failsafe valve when the solenoid 33 described later is in a state in which current is not supplied (the valve body 32 is most separated from the valve seat part 26E), a holding plate 30 having an oil passage 30A formed on a center side thereof, and the like are arranged on an inner side of the cylinder part 26A of the pilot body 26.

A pilot cap 31 is fixed through fitting to an opening end of the cylinder part 26A of the pilot body 26 under a state in which the return spring 28, the disc valve 29, the holding plate 30, and the like are arranged on an inner side of the cylinder part 26A. Cutouts 31A serving as passages for causing the oil liquid, which has flowed to a solenoid 33 side via the oil passage 30A of the holding plate 30, to flow to the oil chamber 19C (reservoir chamber A side) are formed, for example, at four locations in a circumferential direction in the pilot cap 31.

The valve body 32 is provided on one end side of a shaft part 44 of the solenoid 33 described later, and forms, together with the pilot body 26, a pilot valve. The valve body 32 is formed into an approximately cylindrical shape, and a distal end portion thereof has a tapered shape narrowing toward a tip, which seats on and separates from the valve seat part 26E of the pilot body 26. The shaft part 44 is fixed through fitting to an inner side of the valve body 32, thereby providing such a configuration that an opening degree (valve opening pressure) of the valve body 32 is adjusted in accordance with the supply of current (current value) to the solenoid 33 (coil 39). A flange part 32A serving as a spring seat is formed over an entire periphery on a base end side (solenoid 33 side) of the valve body 32. The flange part 32A is brought into abutment against the disc valve 29 when the solenoid 33 (coil 39) is in the state in which current is not supplied, in other words, the valve body 32 is most separated from the valve seat part 26E, to thereby form the failsafe valve.

Next, with reference to FIG. 2 and FIG. 3, description is given of the solenoid 33 forming, together with the damping force adjustment valve 18, the electromagnetic damping force adjustment device 17.

The solenoid 33 used as a damping force variable actuator (electromagnetic actuator) for the electromagnetic damping force adjustment device 17 includes, for example, an overmold 34, a tubular case 36, a coil 39, an anchor member 40, an insert core 41, a cap member 42, the shaft part 44, first and second bushes 45A and 45B, a back-pressure-chamber formation member 46, and a back pressure chamber 47. The solenoid 33 is formed of, for example, a proportional solenoid.

The overmold 34 serving as a cover member forms an outer shell on a distal end side (another end side) of the solenoid 33, and receives the coil 39 thereinside. The overmold 34 is formed into a bottomed tubular shape as a whole using thermosetting resin or the like, and covers an outer peripheral side of the coil 39. The overmold 34 mainly includes a cylindrical tubular part 34A and a lid part 34B. The cylindrical tubular part 34A covers the outer peripheral side of the coil 39. The lid part 34B closes one end side (right end side of FIG. 2) of the tubular part 34A. A part of the lid part 34B in a circumferential direction forms a cable extraction part 34C to which a cable 35 formed of lead wires is connected.

The tubular case 36 forms an outer shell of the solenoid 33 in the circumferential direction, and receives the pilot body 26 and the coil 39 thereinside. The tubular case 36 mainly includes a valve-side tube part 36A, a coil-side tube part 36B, and a flange part 36C. The valve-side tube part 36A is positioned on an outer peripheral side of the pilot valve. The coil-side tube part 36B is positioned on an outer peripheral side of the tubular part 34A of the overmold 34. The flange part 36C is positioned between the valve-side tube part 36A and the coil-side tube part 36B, and protrudes radially inward over an entire periphery. The tubular case 36 is formed as a yoke member having an approximately cylindrical shape using a magnetic substance (magnetic material), and forms a magnetic path upon the supply of current.

The pilot cap 31 of the damping force adjustment valve 18 is fitted (internally fitted) to a radially inner side of the valve-side tube part 36A, and the valve case 19 of the damping force adjustment valve 18 is fitted (externally fitted) to a radially outer side of the valve-side tube part 36A. On this occasion, a seal groove 36A1 is formed over an entire periphery of an outer peripheral surface of the valve-side tube part 36A. A sealing ring 36A2 is mounted to the seal groove 36A1, and a gap between the tubular case 36 and the valve case 19 of the damping force adjustment valve 18 is sealed in a liquid-tight manner by the sealing ring 36A2.

The tubular part 34A of the overmold 34 is fitted (internally fitted) to a radially inner side of the coil-side tube part 36B. Moreover, sealing rings 36B1 and 36B2 for sealing, in a liquid-tight manner, a gap between the tubular case 36 and the overmold 34 are provided between an inner peripheral surface on a distal end side (another end side) of the coil-side tube part 36B and an outer peripheral surface of the overmold 34.

A tapered surface 36C1 formed of an inclined surface having diameter gradually decreased from the one end side toward the another end side is formed on an inner peripheral side on the flange part 36C. The cap member 42 described later is fitted to the inner peripheral side of the flange part 36C. In this case, a sealing ring 36C2 is provided between the tapered surface 36C1 of the flange part 36C and the cap member 42.

A coupling ring 37 is positioned on another end side of the valve case 19, and is formed into an approximately cylindrical shape. On an inner side of the coupling ring 37, there are provided an outer-peripheral-side engagement part 37A for engaging with the inner-peripheral-side engagement part 19B of the valve case 19, and a flange part 37B having an inner diameter dimension which is smaller than an inner diameter dimension of the outer-peripheral-side engagement part 37A. The coupling ring 37 is a member for externally covering an engagement caulking portion between the inner-peripheral-side engagement part 19B of the valve case 19 and the tubular case 36. The coupling ring 37 is fixed through engagement of the outer-peripheral-side engagement part 37A with the inner-peripheral-side engagement part 19B.

A bobbin 38 is provided so as to be positioned on an inner peripheral side of the overmold 34. The bobbin 38 is formed of a resin member made of, for example, thermosetting resin, and is configured to cover (mold-forming) an inner peripheral side of the coil 39. One side in the circumferential direction on another end side of the bobbin 38 is connected to the cable extraction part 34C of the overmold 34. Moreover, the bobbin 38 embeds the insert core 41 described later thereinside to be sealed. On this occasion, an outer peripheral side of the coil 39 is covered with the tubular part 34A of the overmold 34, and an inner peripheral side thereof is covered with the bobbin 38. The coil 39 is configured to generate a magnetic force through supply of power (supply of current) via the cable 35.

The anchor member 40 is provided as a fixed iron core so as to be positioned on inner peripheral sides of the tubular case 36 and the bobbin 38. The anchor member 40 includes a tube part 40A and a flange part 40B. The tube part 40A receives the shaft part 44 inserted thereinside. The flange part 40B protrudes radially outward from an outer peripheral surface of the tube part 40A. The anchor member 40 is configured to attract the movable iron core 43 described later when the magnetic force is generated by the coil 39. In this case, an outer peripheral surface of the flange part 40B is brought into abutment against the inner peripheral surface of the valve-side tube part 36A of the tubular case 36, to thereby provide a configuration of enabling efficient transfer of a magnetic flux between the flange part 40B and the valve-side tube part 36A.

A bottomed hole part 40C, into which the movable iron core 43 enters when the movable iron core 43 is attracted, is formed in an end surface opposing the movable iron core 43 out of the tube part 40A. Moreover, a bush fitting hole 40D, to which a first bush (bearing) 45A configured to support the shaft part 44 described later is fitted, is formed on an inner peripheral side of the anchor member 40.

On this occasion, an outer peripheral surface on another end side (right end side of FIG. 2), which is a movable iron core 43 side, out of the anchor member 40 forms an annular conical part 40E having a tapered surface inclined so that an outer diameter dimension increases toward one end side (a flange part 40B side or a left end side of FIG. 2). In other words, the conical part 40E is formed on an outer peripheral side of the bottomed hole part 40C. This conical part 40E provides a linear magnetic characteristic between the anchor member 40 and the movable iron core 43.

The insert core 41 is positioned inside the bobbin 38, and is provided so as to cover the inner peripheral side and the another end side of the coil 39. The insert core 41 is formed of a yoke made of a magnetic material, and includes a tube part 41A and a flange part 41B. The tube part 41A receives the movable iron 43 inserted thereinside. The flange part 41B protrudes radially outward from an outer peripheral surface of the tube part 41A. In this case, as illustrated in FIG. 2, an inner peripheral side of the tube part 41A opposing the movable iron core 43 is not sealed by the bobbin 38, and thus forms a magnetic circuit enabling transfer of the magnetic flux between the tube part 41A and the movable iron core 43.

A plurality (for example, two) of cutouts 41C for connecting the cable 35 to the coil 39 are formed in a circumferential direction on an outer peripheral side of the flange part 41B. The cutouts 41C has a function of improving a resin run at the time of forming the overmold 34, in addition to a function of allowing the cable 35 to pass therethrough.

The cap member 42 is positioned on the inner peripheral side of the coil 39 (bobbin 38), and is provided so as to surround, for example, the anchor member 40, the movable iron core 43, and the back-pressure-chamber formation member 46. The cap member 42 is formed into a bottomed stepped cylindrical shape using a thin plate made of a non-magnetic material, and includes a bottom part 42A, a first tube part 42B, a second tube part 42C, a tapered part 42D, and a flange part 42E. The cap member 42 maintains an inside of the solenoid 33 in a liquid-tight state, to thereby prevent the oil liquid inside the damping force adjustment valve 18 from flowing to the outside.

The bottom part 42A of the cap member 42 is positioned on an inner peripheral side of the lid part 34B of the overmold 34, and closes another end side of the cap member 42. Moreover, the first tube part 42B is provided so as to be positioned on outer peripheral sides of the movable iron core 43 and the back-pressure-chamber formation member 46. The second tube part 42C is provided so as to be positioned on an outer peripheral side of the anchor member 40. In this case, an exterior dimension of the second tube part 42C is formed so as to be larger than an exterior dimension of the first tube part 42B. The first tube part 42B and the second tube part 42C are connected to each other via the tapered part 42D. The tapered part 42D forms an inclined surface which extends so as to align with the slope of the conical part 40E of the anchor member 40. The flange part 42E is provided between the flange part 36C of the tubular case 36 and the flange part 40B of the anchor member 40 by bending the one end side of the second tube part 42C radially outward.

The movable iron core 43 is disposed on an inner peripheral side of the cap member 42, and is integrally fixed to the shaft part 44, thereby being provided as an iron core movable in the axial direction. The movable iron core 43 is formed into an approximately cylindrical shape using, for example, an iron-based magnetic substance, and is attracted by the anchor member 40, thereby generating a thrust force when the magnetic force is generated by the coil 39. A communication passage 43A is formed in the movable iron core 43 so that the oil liquid in the solenoid 33 does not serve as a flow passage resistance against the displacement of the movable iron core 43. Moreover, on an inner peripheral side of the movable iron core 43, a tapered surface 43B inclined so that an inner diameter dimension of the inner peripheral surface increases in a direction from the one side toward the another side is formed.

The shaft part 44 is provided so as to be positioned on inner peripheral sides of the anchor member 40, the movable iron core 43, and the back-pressure-chamber formation member 46. Both sides of the shaft part 44 in the axial direction are supported for displacement in the axial direction by the anchor member 40 and the back-pressure-chamber formation member 46 via the first and second bushes 45A and 45B. The movable iron core 43 is integrally fixed (sub-assembled) to an intermediate portion of the shaft part 44 by press-fitting or the like, thereby transmitting the thrust force of the movable iron core 43 to the valve body 32. On this occasion, a communication passage 44A, which is formed of a shaft hole passing through the shaft part 44 in the axial direction, and causes the pilot valve and the back-pressure-chamber formation member 46 to communicate to each other, is provided on the inner peripheral side of the shaft part 44. In this embodiment, the back-pressure-chamber formation member 46 and the second bush 45B are formed independently of each other, but may be integrally formed.

The one end side (left end side of FIG. 2) of the shaft part 44 protrudes from the anchor member 40, and the valve body 32 of the damping force adjustment valve 18 is fixed to a protruding end thereof. Thus, the valve body 32 moves (displaces) integrally with the movable iron core 43 and the shaft part 44. In other words, a valve opening degree or the valve opening pressure of the valve body 32 corresponds to the thrust force of the movable iron core 43 based on the supply of current to the coil 39. As a result, the movable iron core 43 opens and closes the pilot valve of the damping force adjustment valve 18, that is, the valve body 32 with respect to the valve seat part 26E of the pilot body 26 through movement in the axial direction.

The first bush 45A is provided in the bush fitting hole 40D of the anchor member 40, and is configured to support one end side of the shaft part 44 as the bearing. Moreover, the second bush 45B is provided in the bush fitting hole 46C of the back-pressure-chamber formation member 46 described later, and is configured to support another end side of the shaft part 44 as the bearing. The shaft part 44 is slidably guided in the axial direction by the first bush 45A and the second bush 45B.

The back-pressure-chamber formation member 46 is provided so as to be fitted to an inner periphery on another end side (bottom part 42A side) of the cap member 42. The back-pressure-chamber formation member 46 is formed into a bottomed stepped cylindrical shape using a non-magnetic substance (non-magnetic material), and mainly includes a bottom part 46A and a tube part 46B. Moreover, the bush fitting hole 46C, to which the second bush 45B for supporting the shaft part 44 is fitted, is formed on the inner peripheral side of the back-pressure-chamber formation member 46. The back-pressure-chamber formation member 46 forms the back pressure chamber 47 into which the oil liquid flows thereinside, and decreases a pressure reception area of the valve body 32 in a state in which the oil liquid fills the inside of the back pressure chamber 47. In other words, the back pressure chamber 47 is formed of a space defined by another end (end portion on an opposite side of the anchor member 40) of the shaft part 44, an inner peripheral surface (inner peripheral surface of the tube part 46B) of the second bush 45B, and an inner peripheral surface of the bottom part 46A. In this case, as illustrated in FIG. 3, a pressure reception area of the back pressure chamber 47 is narrower than a pressure reception area of receiving a hydraulic pressure force of the valve body 32 in the gap to the valve seat part 26E.

The electromagnetic damping force adjustment device 17 in this embodiment and the shock absorber 1 into which the electromagnetic damping force adjustment device 17 is built has the above-mentioned configuration. Next, description is given of the operation thereof.

First, when the shock absorber 1 is assembled to a vehicle, for example, a motor vehicle, the top end side of the piston rod 8 is mounted, for example, to the vehicle body side of the vehicle, and the side of the mounting eye 3A provided on the bottom cap 3 is mounted to the wheel side. Moreover, the cable 35 of the solenoid 33 is connected to a controller (not shown) of the vehicle or the like.

During traveling of the vehicle, when vibration in an up-and-down direction is generated due to recesses and protrusions of a road surface and the like, the piston rod 8 is displaced so as to extend and retract with respect to the outer tube 2, and the damping force can be generated by the electromagnetic damping force adjustment device 17 and the like, thereby absorbing the vibration of the vehicle. On this occasion, the generated damping force of the shock absorber 1 (damping force adjustment valve 18) can variably be adjusted by the controller controlling the current value of current to the coil 39 of the solenoid 33, to thereby adjust the opening degree (valve opening pressure) of the valve body 32.

For example, the compression-side check valve 7 of the piston 5 is closed through the movement of the piston 5 in the inner tube 4 in an extension stroke of the piston rod 8. Before the opening of the disc valve 6 of the piston 5, the oil liquid in the rod-side oil chamber B is pressurized, and flows into the oil passage 20B of the tubular holder 20 of the damping force adjustment valve 18 via the oil holes 4A of the inner tube 4, the annular oil chamber D, and the connection port 12C of the intermediate tube 12. On this occasion, the oil liquid corresponding to the movement of the piston 5 opens the extension-side check valve 16 in the bottom valve 13, and flows from the reservoir chamber A to the bottom-side oil chamber C. When the pressure in the rod-side oil chamber B reaches the valve opening pressure of disc valve 6, the disc valve 6 opens, and relieves the pressure in the rod-side oil chamber B to the bottom-side oil chamber C.

In the electromagnetic damping force adjustment device 17, before the opening (in a piston speed low speed region) of the main disc valve 23, as indicated by the arrow X of FIG. 3, the oil liquid, which has flowed into the oil passage 20B of the tubular holder 20, passes through the center hole 21A of the valve member 21, the center hole 24B of the pilot pin 24, and the center hole 26C of the pilot body 26, pushes out the valve body 32 at a slight small opening degree, and flows to an inner side of the pilot body 26. Then, the oil liquid, which has flowed to an inner side of the pilot body 26, passes through a gap between the flange part 32A of the valve body 32 and the disc valve 29, the oil passage 30A of the holding plate 30, the cutouts 31A of the pilot cap 31, and the oil chamber 19C of the valve case 19, and flows into the reservoir chamber A.

Then, along with the increase in piston speed, when a pressure in the oil passage 20B of the tubular holder 20, that is, a pressure in the rod-side oil chamber B reaches the valve opening pressure of the disc valve 23, as indicated by the arrow Y of FIG. 3, the oil liquid, which has flowed into the oil passage 20B of the tubular holder 20, passes through the oil passage 21B of the valve member 21, pushes and opens the main disc valve 23, passes through the oil chamber 19C of the valve case 19, and flows into the reservoir chamber A.

On the other hand, in the compression stroke of the piston rod 8, the compression-side check valve 7 of the piston 5 is opened, and the extension-side check valve 16 of the bottom valve 13 is closed through the movement of the piston 5 in the inner tube 4. Before the opening of the bottom valve 13 (disc valve 15), the oil liquid in the bottom-side oil chamber C flows into the rod-side oil chamber B. Simultaneously, the oil liquid corresponding to the amount of entry of the piston rod 8 into the inner tube 4 flows from the rod-side oil chamber B to the reservoir chamber A via the damping force adjustment valve 18 in the path as in the extension stroke described above. When the pressure in the bottom-side oil chamber C reaches a valve opening pressure of the bottom valve 13 (disc valve 15), the bottom valve 13 (disc valve 15) opens, to thereby relieve the pressure in the bottom-side oil chamber C to the reservoir chamber A.

As a result, in the extension stroke and the compression stroke of the piston rod 8, before the main disc valve 23 of the damping force adjustment valve 18 opens (in the piston speed low region), the damping force is generated in accordance with the opening degree of the valve body 32. Meanwhile, after the main disc valve 23 opens (in the piston speed high region), the damping force is generated in accordance with the opening degree of the main disc valve 23. In this case, the opening degree of the valve body 32 is variably controlled as follows through the supply of current to the coil 39 of the solenoid 33, thereby adjusting the magnetic force (thrust force) generated in the movable iron core 43.

In other words, when the thrust force of the movable iron core 43 is decreased by decreasing the supplied current to the coil 39, the opening degree of the valve body 32 increases, and the damping force on the soft side is thus generated. On this occasion, a damping force may be generated by the orifice 24C of the pilot pin 24. On the other hand, when the thrust force of the movable iron core 43 is increased by increasing the supplied current to the coil 39, the opening degree of the valve body 32 is decreased, and the damping force on the hard side is thus generated. On this occasion, in response to the change in opening degree of the valve body 32, an inner pressure of the pilot chamber 27 communicating via the oil passage 25 on an upstream side thereof changes. The valve opening pressure of the main disc valve 23 can simultaneously be adjusted by variably controlling the opening degree of the valve body 32 in this way, thereby being capable of increasing an adjustment range of the damping force characteristic.

When the thrust force of the movable iron core 43 is lost by disconnection in the coil 39 or the like, as illustrated in FIG. 2, the valve body 32 retreats (is displaced toward the direction separating from the valve seat part 26E) by the return spring 28, and the flange part 32A of the valve body 32 and the disc valve 29 are brought into abutment against each other. In this state, a damping force can be generated by opening the disc valve 29, and a required damping force can thus be provided even upon a failure, for example, the disconnection in the coil.

On this occasion, as illustrated in FIG. 3, in the state in which the valve body 32 seats on the valve seat part 26E through the supply of current to the solenoid 33 (coil 39) (in other words, upon the closing of the valve body 32), the oil liquid in the pilot pin 24 positioned on an upstream side of the valve body 32 flows to the back pressure chamber 47 through the communication passage 44A of the shaft part 44. Then, a hydraulic pressure in a direction of pushing the shaft part 44 from another end side toward the one end side is generated on the another end surface of the shaft part 44 by the oil liquid, which has flowed into the back pressure chamber 47. As a result, the pressure reception area of receiving the hydraulic pressure force on an upstream side (pilot pin 24 side) of the valve body 32 is an area obtained by subtracting a cross sectional area of the shaft part 44 from an area of the valve body 32 facing the valve seat part 26E.

Moreover, as indicated by the arrow M of FIG. 3, the magnetic force (magnetic flux) generated by the coil 39 flows in a sequence of the coil-side tube part 36B of the tubular case 36, an abutment portion (not shown) between the coil-side tube part 36B of the tubular case 36 and the flange part 41B of the insert core 41, the insert core 41, the movable iron core 43, and further flows from the movable iron core 43 to the conical part 40E of the anchor member 40, the anchor member 40, and the abutment portion between the flange part 40B of the anchor member 40 and the valve-side tube part 36A of the tubular case 36. In this case, the back-pressure-chamber formation member 46 is formed of the non-magnetic substance, and the magnetic force upon the supply of current to the coil 39 does not flow through the back-pressure-chamber formation member 46, and can reach the movable iron core 43 through the insert core 41.

Moreover, in the flow of the magnetic flux indicated by the arrow M of FIG. 3, the magnetic flux can be smoothly transferred due to the narrow gaps between the respective members.

In this manner, according to this embodiment, the back-pressure-chamber formation member 46 positioned on the another end side of the shaft member 44 is formed of the non-magnetic substance. With this configuration, the back-pressure-chamber formation member 46 is not magnetized upon the supply of current to the coil 39, and an efficient closed magnetic path can thus be formed around the coil 39. As a result, the movable iron core 43 is not attracted toward the back-pressure-chamber formation member 46 side. Thus, the movable iron core 43 can be attracted by the magnetic force of the anchor member 40 toward a valve seat part 26E side of the pilot body 26, thereby efficiently driving the valve body 32 toward the closing direction against the return spring 28 through the minimum magnetic force (current value).

In other words, in this embodiment, there is adopted such a configuration that, even when the back pressure chamber 47 is formed in the cap member 42, the magnetic efficiency of the solenoid 33 is increased, and the movable iron core 43 is attracted toward the anchor member 40 side, thereby driving the valve body 32 toward the closing direction. With this configuration, the coil 39 can be downsized, thereby decreasing a manufacturing cost. As a result, the magnetic flux can smoothly be transferred while the size and the weight of the solenoid 33 as a whole can be decreased.

Moreover, the back-pressure-chamber formation member 46 is not magnetized, and even when magnetic contamination (abrasion powder) flows into the back pressure chamber 47 via the communication passage 44A of the shaft part 44, retention of the magnetic contamination in the back pressure chamber 47 can be suppressed. In other words, the attraction of the magnetic contamination by the back-pressure-chamber formation member 46 can be suppressed, and the magnetic contamination, which has flowed into the back pressure chamber 47, is not retained in the back pressure chamber 47, and flows out via the communication passage 44A. As a result, the magnetic contamination caught in the second bush 45B can be suppressed, thereby being capable of decreasing damage on the solenoid 33, and improving reliability of the solenoid 33.

Moreover, the cap member 42 is provided so as to surround the anchor member 40, the movable iron core 43, the back-pressure-chamber formation member 46, and the like. With this configuration, the hydraulic pressure force in the cap member 42 can be received mainly by the anchor member 40, the movable iron core 43, the back-pressure-chamber formation member 46, and the like, and direct reception of the hydraulic pressure force in the solenoid 33 by the cap member 42 can be suppressed. Thus, the hydraulic pressure force received by the cap member 42 can be decreased, and a thickness dimension of the cap member 42 can be decreased (thinned), thereby decreasing the weight. As a result, a magnetic resistance of the cap member 42 can be decreased, and the magnetic flux can thus be transferred from the insert core 41 to the movable iron core 43 via the cap member 42 with a high magnetic efficiency.

On this occasion, a damping force adjustment device described in Patent Literature 2 is configured to pass a magnetic flux to a movable iron core via a member (stator core main body) for supporting a bush. In this case, it is required that the stator core main body be disposed on an outer peripheral side of the movable iron core, and thus an outer diameter of a cap member disposed on an outer peripheral side of the stator core main body increases. Therefore, the pressure resistance of the cap member is liable to decrease.

On the other hand, according to this embodiment, there is adopted such a configuration that the magnetic flux generated by the coil 39 is transferred to the movable iron core 43 via the tube part 41A of the insert core 41. In this case, the cap member 42 can be disposed on an outer peripheral side of the movable iron core 43, and hence an inner diameter of the cap member 42 can be decreased as compared with the configuration described in Patent Literature 2. With this configuration, the pressure reception area of the hydraulic pressure received by the cap member 42 can be decreased as a whole, and the weight of the cap member 42 can thus be decreased while the pressure resistance of the cap member 42 is secured. As a result, the thickness dimension of the cap member 42 can be decreased, and the magnetic resistance of the cap member 42 can thus be decreased, thereby efficiently transferring the magnetic flux to the movable iron core 43.

Moreover, there is adopted such a configuration that the back pressure chamber 47 communicating to the communication passage 44A of the shaft part 44 is formed on the another end side of the solenoid 33. With this configuration, the pressure reception area of the valve body 32 can be an area obtained by subtracting the cross sectional area of the shaft part 44 from the area of the valve body 32 facing the valve seat part 26E. Consequently, as compared with a configuration of the solenoid without a back pressure chamber, even when the amount current supplied to the coil 39 is decreased, the valve body 32 can be closed, and the coil 39 can thus be downsized.

Moreover, as a result of the formation of the back pressure chamber 47 for the solenoid 33, the pressure reception area of the valve body 32 can be adjusted through the diameter of the communication passage 44A of the shaft part 44. With this configuration, a degree of freedom of setting an opening characteristic of the valve body 32, consequently a degree of freedom of setting the damping force characteristic of the electromagnetic damping force adjustment device 17 can be increased.

Moreover, there is adopted such a configuration that, on the inner peripheral side of the movable iron core 43, the tapered surface 43B inclined so that the inner diameter dimension of the inner peripheral surface increases in the direction from the one side toward the another side is formed. With this configuration, as compared with a movable iron core without a tapered surface, the volume can be decreased, and the weight of the movable iron core 43 can thus be decreased. As a result, a resistance upon an axial displacement of the movable iron core 43 can be decreased, and the movable iron core 43 can efficiently be displaced upon the supply of current to the coil 39, thereby closing the valve body 32. Moreover, the magnetic flux density is high between the insert core 41 and the movable iron core 43, and the magnetic flux density is low between the movable iron core 43 and the anchor member 40 as compared with that between the insert core 41 and the movable iron core 43. Thus, the thickness of the portion out of the movable iron core 43 in which the magnetic flux density is high is decreased, the thickness is increased toward the portion in which the magnetic flux density is low, and a decrease in magnetic flux density can thus be suppressed, thereby maintaining the magnetic characteristic.

In the above-mentioned embodiment, a description is given of the example in which the solenoid 33 is formed of the proportional solenoid. However, the configuration is not limited to this example, and the solenoid 33 may be formed of, for example, an on/off solenoid.

Next, description is given of the invention included in the above-mentioned embodiment. That is, according to the present invention, a pressure reception area of the valve body is a pressure reception area obtained by subtracting a cross sectional area of the shaft part from an area of the valve body facing a valve seat part as a result of communication of hydraulic fluid on an upstream side of the valve body with the back pressure chamber via the communication passage in a state in which the valve body seats on the valve seat part. With this configuration, the amount of current supplied to the coil that is given when the valve body is closed can be decreased.

As the damping force adjustable shock absorber based on the above-mentioned embodiment, for example, forms described below can be exemplified.

As a first aspect of the damping force adjustable shock absorber, the damping force adjustable shock absorber includes: a coil, which is configured to generate a magnetic force through supply of current; a cap member, which has a bottomed tubular shape, and is disposed on an inner peripheral side of the coil; an iron core, which is disposed on an inner peripheral side of the cap member, and is provided so as to be movable in an axial direction of the damping force adjustable shock absorber; a fixed iron core, which is configured to attract the iron core; a shaft part, which is provided on an inner peripheral side of the iron core, and has a communication passage is formed on an inner peripheral side thereof; a valve body, which is provided in the shaft part; a bush, which is configured to support the shaft part; and a back-pressure-chamber formation member, which has a bottomed tubular shape, has an inner peripheral side fitted to the bush, and forms a back pressure chamber between an end portion of the shaft part that is opposite to the fixed iron core and the bush, wherein the back-pressure-chamber formation member is formed of a non-magnetic substance.

According to a second aspect of the damping force adjustable shock absorber, in the first aspect, a pressure reception area of the valve body is a pressure reception area obtained by subtracting a cross sectional area of the shaft part from an area of the valve body facing a valve seat part as a result of communication of hydraulic fluid on an upstream side of the valve body with the back pressure chamber via the communication passage in a state in which the valve body seats on the valve seat part.

According to a third aspect of the damping force adjustable shock absorber, in the first or second aspect, the coil is provided with, on the outer periphery of the coil, an overmold, which has a bottomed tubular shape, and is configured to cover an outer periphery of the coil.

According to a fourth aspect of the damping force adjustable shock absorber, in any one of the first to third aspects, the bush and the back-pressure-chamber formation member are formed integrally with each other.

A description has been given of only an embodiment of the present invention, but it is readily understood by a person skilled in the art that various changes and improvements can be made to the exemplified embodiment without practically departing from the novel teachings and advantages of the present invention. Thus, forms to which such changes and improvements are made are also intended to be included in the technical scope of the present invention. The above-mentioned embodiment may be arbitrarily combined.

The present application claims priority from Japanese Patent Application No. 2015-210864 filed on Oct. 27, 2015. The entire disclosure including Specification, Scope of Claims, Drawings, and Abstract of Japanese Patent Application No. 2015-210864 filed on Oct. 27, 2015 is incorporated herein in its entirety by reference.

REFERENCE SIGNS LIST 1 damping force adjustable shock absorber, 26E valve seat part, 32 valve body, 34 overmold, 39 coil, 40 anchor member (fixed iron core), 42 cap member, 43 movable iron core (iron core), 44 shaft part, 44A communication passage, 45B second bush (bush), 46 back-pressure-chamber formation member, 47 back pressure chamber

The invention claimed is:

1. A damping force adjustable shock absorber, comprising:
   a coil, which is configured to generate a magnetic force through supply of current;

a cap member, which has a bottomed tubular shape, and is disposed on an inner peripheral side of the coil;

an iron core, which is disposed on an inner peripheral side of the cap member, and is provided so as to be movable in an axial direction of the damping force adjustable shock absorber;

a fixed iron core, which is configured to attract the iron core;

a shaft part, which is provided on an inner peripheral side of the iron core, and has a communication passage formed on an inner peripheral side thereof;

a valve body, which is provided in the shaft part;

a bush, which is configured to support the shaft part; and a back-pressure-chamber formation member, which has a bottomed tubular shape, has an inner peripheral side fitted to the bush, and forms a back pressure chamber between an end portion of the shaft part that is opposite to the fixed iron core and the bush, wherein the back-pressure-chamber formation member is formed of a non-magnetic sub stance.

2. A damping force adjustable shock absorber according to claim 1, wherein a pressure reception area of the valve body is a pressure reception area obtained by subtracting a cross sectional area of the shaft part from an area of the valve body facing a valve seat part as a result of communication of hydraulic fluid on an upstream side of the valve body with the back pressure chamber via the communication passage in a state in which the valve body seats on the valve seat part.

3. A damping force adjustable shock absorber according to claim 1, wherein the coil is provided with, on the outer periphery thereof, an overmold, which has a bottomed tubular shape, and is configured to cover an outer periphery of the coil.

4. A damping force adjustable shock absorber according to claim 1, wherein the bush and the back-pressure-chamber formation member are formed integrally with each other.

* * * * *